United States Patent
Surlaker et al.

(10) Patent No.: US 9,390,118 B2
(45) Date of Patent: Jul. 12, 2016

(54) COMPUTER IMPLEMENTED METHOD FOR TRANSFORMING AN EVENT NOTIFICATION WITHIN A DATABASE NOTIFICATION INFRASTRUCTURE

(75) Inventors: Kapil Surlaker, Mountain View, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1212 days.

(21) Appl. No.: 11/408,195

(22) Filed: Apr. 19, 2006

(65) Prior Publication Data

US 2007/0250545 A1    Oct. 25, 2007

(51) Int. Cl.
G06F 7/00 (2006.01)
G06F 17/30 (2006.01)

(52) U.S. Cl.
CPC .... *G06F 17/30368* (2013.01); *G06F 17/30569* (2013.01)

(58) Field of Classification Search
CPC ................................................ G06F 17/30368
USPC .......................... 707/104.1, 100, 10, 200, 951
See application file for complete search history.

(56) References Cited

U.S. PATENT DOCUMENTS

| | | | |
|---|---|---|---|
| 5,418,940 A * | 5/1995 | Mohan | 714/5.11 |
| 5,471,629 A | 11/1995 | Risch | |
| 5,592,664 A | 1/1997 | Starkey | |
| 5,666,486 A | 9/1997 | Alfieri et al. | |
| 5,828,882 A | 10/1998 | Hinckley | |
| 5,881,315 A | 3/1999 | Cohen | |
| 5,999,978 A | 12/1999 | Angal et al. | |
| 6,058,389 A | 5/2000 | Chandra et al. | |
| 6,092,102 A | 7/2000 | Wagner | |
| 6,138,121 A * | 10/2000 | Costa et al. | |
| 6,182,086 B1 | 1/2001 | Lomet et al. | |
| 6,240,453 B1 | 5/2001 | Chang et al. | |
| 6,292,825 B1 | 9/2001 | Chang et al. | |
| 6,427,146 B1 | 7/2002 | Chu | |
| 6,438,705 B1 | 8/2002 | Chao et al. | |
| 6,560,719 B1 | 5/2003 | Pham et al. | |

(Continued)

OTHER PUBLICATIONS

Office Action for U.S. Appl. No. 11/401,560 mailed on Sep. 10, 2012.
U.S. Appl. No. 11/401,560, Non-Final Office Action, mailed Mar. 22, 2012, 36 pages.
U.S. Appl. No. 11/401,560, Notice of Allowance, mailed Feb. 5, 2013, 7 pages.
U.S. Appl. No. 11/471,406, Notice of Allowance, mailed Feb. 19, 2013, 18 pages.
Hanson et al, "A Flexible and Recoverable Client/server Database Event Notification System," Springer-Verlag, pp. 1998;1-13.
Cyran, "Oracle Database, Concepts, 10g Release 1 (10.1)", Dec. 2003; pp. 1-732.

(Continued)

*Primary Examiner* — Eliyah S Harper
(74) *Attorney, Agent, or Firm* — Kilpatrick Townsend & Stockton LLP (57) ABSTRACT

A computer implemented method for automatically transforming an event notification within a database notification infrastructure based on client specified formatting and/or editing procedures. The method includes transforming the event notification having a format compatible with a database using a client specific format conversion procedure into a client-compatible event notification format. Further, the method may include transforming the payload portion of the event notification having a format compatible with a database using a client specific format conversion procedure into a linear event notification format. Moreover, the method may include transforming the event notification using a client specific editing procedure. The client specified procedures may be specified during event registration by the client. The transformed and/or edited event notifications may be forwarded to the client.

31 Claims, 10 Drawing Sheets

(56) References Cited

U.S. PATENT DOCUMENTS

| | | |
|---|---|---|
| 6,757,766 B1 | 6/2004 | Hutner et al. |
| 6,768,994 B1 * | 7/2004 | Howard et al. |
| 6,775,671 B1 * | 8/2004 | de Lara et al. |
| 6,782,541 B1 | 8/2004 | Cohen et al. |
| 6,820,136 B1 | 11/2004 | Pham et al. |
| 6,826,560 B1 | 11/2004 | Leymann et al. |
| 6,829,639 B1 | 12/2004 | Lawson et al. |
| 6,839,748 B1 | 1/2005 | Allavarpu et al. |
| 6,862,595 B1 | 3/2005 | Elko et al. |
| 6,889,231 B1 | 5/2005 | Souder et al. |
| 6,920,468 B1 | 7/2005 | Cousins et al. |
| 6,931,405 B2 | 8/2005 | El-Shimi et al. |
| 7,039,671 B2 | 5/2006 | Cullen |
| 7,149,738 B2 * | 12/2006 | Kumar et al. .................. 707/694 |
| 7,177,859 B2 | 2/2007 | Pather et al. |
| 7,185,033 B2 | 2/2007 | Jain et al. |
| 7,203,706 B2 | 4/2007 | Jain et al. |
| 7,315,863 B2 | 1/2008 | Kambo et al. |
| 7,325,019 B2 | 1/2008 | Lam et al. |
| 7,334,001 B2 | 2/2008 | Eichstaedt et al. |
| 7,509,415 B2 | 3/2009 | Baekelmans et al. |
| 7,516,221 B2 | 4/2009 | Souder et al. |
| 7,523,459 B2 | 4/2009 | Rusell |
| 7,555,502 B2 | 6/2009 | Chandrasekaran |
| 7,584,114 B2 * | 9/2009 | Estrada et al. ..................... 705/9 |
| 7,613,740 B2 | 11/2009 | Holenstein et al. |
| 7,761,413 B2 | 7/2010 | Surlaker et al. |
| 7,895,600 B2 | 2/2011 | Surlaker et al. |
| 8,458,725 B2 | 6/2013 | Surlaker et al. |
| 8,464,275 B2 | 6/2013 | Surlaker et al. |
| 2001/0000537 A1 | 4/2001 | Inala et al. |
| 2002/0095399 A1 | 7/2002 | Devine et al. |
| 2002/0106070 A1 | 8/2002 | Elsey et al. |
| 2002/0116248 A1 | 8/2002 | Amit et al. |
| 2002/0143819 A1 | 10/2002 | Han et al. |
| 2002/0165998 A1 | 11/2002 | Hrebejk et al. |
| 2002/0184111 A1 | 12/2002 | Swanson |
| 2003/0004952 A1 | 1/2003 | Nixon et al. |
| 2003/0028495 A1 | 2/2003 | Pallante |
| 2003/0055768 A1 | 3/2003 | Anaya et al. |
| 2003/0055829 A1 * | 3/2003 | Kambo et al. ................. 707/100 |
| 2003/0061231 A1 * | 3/2003 | Lovegren .................. 707/103 Y |
| 2003/0069959 A1 | 4/2003 | Tse |
| 2003/0208549 A1 | 11/2003 | El-Shimi et al. |
| 2003/0225820 A1 * | 12/2003 | Chkodrov et al. ............ 709/201 |
| 2004/0024794 A1 | 2/2004 | Jain et al. |
| 2004/0034664 A1 | 2/2004 | Jain et al. |
| 2004/0064430 A1 | 4/2004 | Klein et al. |
| 2004/0068481 A1 | 4/2004 | Seshadri et al. |
| 2004/0088401 A1 | 5/2004 | Tripathi et al. |
| 2004/0117407 A1 * | 6/2004 | Kumar et al. ................. 707/200 |
| 2004/0123183 A1 | 6/2004 | Tripathi et al. |
| 2004/0128344 A1 | 7/2004 | Trossen |
| 2004/0249853 A1 | 12/2004 | Cohen et al. |
| 2004/0254993 A1 | 12/2004 | Mamas |
| 2005/0003804 A1 | 1/2005 | Huomo et al. |
| 2005/0021622 A1 | 1/2005 | Cullen |
| 2005/0021976 A1 | 1/2005 | Trossen |
| 2005/0027742 A1 | 2/2005 | Eichstaedt et al. |
| 2005/0038772 A1 | 2/2005 | Colrain et al. |
| 2005/0038791 A1 * | 2/2005 | Ven .............................. 707/100 |
| 2005/0038801 A1 | 2/2005 | Colrain et al. |
| 2005/0038831 A1 | 2/2005 | Souder et al. |
| 2005/0038833 A1 | 2/2005 | Colrain et al. |
| 2005/0038834 A1 | 2/2005 | Souder et al. |
| 2005/0080819 A1 | 4/2005 | Russell |
| 2005/0182775 A1 * | 8/2005 | Fitzgerald et al. ............ 707/100 |
| 2005/0198273 A1 | 9/2005 | Childress |
| 2005/0203908 A1 | 9/2005 | Lam et al. |
| 2006/0077454 A1 | 4/2006 | Lum et al. |
| 2006/0200501 A1 | 9/2006 | Holenstein |
| 2006/0209868 A1 | 9/2006 | Callaghan |
| 2006/0235831 A1 | 10/2006 | Adinolfi et al. |
| 2006/0277299 A1 | 12/2006 | Baekelmans et al. |
| 2007/0112885 A1 | 5/2007 | Farr |
| 2007/0168892 A1 * | 7/2007 | Brush et al. .................... 715/963 |
| 2007/0192386 A1 | 8/2007 | Fries et al. |
| 2007/0214191 A1 | 9/2007 | Chandrasekaran |
| 2007/0240169 A1 | 10/2007 | Surlaker et al. |
| 2007/0240170 A1 | 10/2007 | Surlaker et al. |
| 2007/0266052 A1 | 11/2007 | Surlaker et al. |
| 2007/0266393 A1 | 11/2007 | Surlaker et al. |
| 2007/0276914 A1 | 11/2007 | Surlaker et al. |
| 2008/0098044 A1 | 4/2008 | Todd |

OTHER PUBLICATIONS

"Sun One Messaging and Collaboration Event Notification Manual," Sun Microsystems, 2002, pp. 1-16.
Office Action for U.S. Appl. No. 11/471,406, mailed on Aug. 17, 2012.
Muthulingam, et al., "The Do's and Don'ts of Space and Undo Management: Best Practice for Oracle Database 10g", An Oracle White Paper, Dec. 2004, pp. 1-34.
Final Office Action for U.S. Appl. No. 11/471,406, mailed on May 24, 2011, 28 pages.
Advisory Action for U.S. Appl. No. 11/401,560 mailed on Mar. 4, 2011; 4 pages.
Final Office Action for U.S. Appl. No. 11/401,560 mailed on Dec. 28, 2010; 34 pages.
Notice of Allowance for U.S. Appl. No. 11/471,167 mailed Dec. 6, 2010, 9 pages.
Non-Final Office Action for U.S. Appl. No. 11/471,406 mailed on Nov. 10, 2010; 27 pages.
Non-Final Office Action for U.S. Appl. No. 11/471,167 mailed on Jul. 20, 2010; 13 pages.
Non-Final Office Action for U.S. Appl. No. 11/401,560 mailed on Jun. 4, 2010; 32 pages.
Interview Summary for U.S. Appl. No. 11/471,406 mailed on May 24, 2010, 3 pages.
Advisory Action for U.S. Appl. No. 11/471,406 mailed on May 5, 2010; 6 pages.
Notice of Allowance for U.S. Appl. No. 11/471,405 mailed on Apr. 20, 2010; 9 pages.
Advisory Action for U.S. Appl. No. 11/471,167 mailed on Feb. 25, 2010; 4 pages.
Advisory Action for U.S. Appl. No. 11/401,560 mailed on Feb. 23, 2010, 4 pages.
Final Office Action for U.S. Appl. No. 11/471,406 mailed on Feb. 22, 2010; 23 pages.
Notice of Allowance for U.S. Appl. No. 11/471,405 mailed on Jan. 26, 2010; 8 pages.
Final Office Action for U.S. Appl. No. 11/471,167 mailed on Dec. 15, 2009; 13 pages.
Final Office Action for U.S. Appl. No. 11/401,560 mailed on Dec. 9, 2009; 27 pages.
Final Office Action for U.S. Appl. No. 11/401,658 mailed on Nov. 3, 2009; 22 pages.
Non Final Office Action for U.S. Appl. No. 11/471,406 mailed on Aug. 18, 2009; 16 pages.
Non Final Office Action for U.S. Appl. No. 11/471,167 mailed on Aug. 11, 2009; 7 pages.
Non-Final Office Action for U.S. Appl. No. 11/471,405 mailed on Jul. 7, 2009; 18 pages.
Non Final Office Action for U.S. Appl. No. 11/401,560 mailed on Jul. 6, 2009; 21 pages.
Non-Final Office Action for U.S. Appl. No. 11/401,658 mailed on Jul. 2, 2009, 18 pages.
Advisory Action for U.S. Appl. No. 11/471,405 mailed on Apr. 13, 2009; 3 pages.
Final Office Action for U.S. Appl. No. 11/471,405 mailed on Jan. 23, 2009; 15 pages.
Non-Final Office Action for U.S. Appl. No. 11/471,405 mailed on May 14, 2008; 13 pages.

* cited by examiner

COMPUTER IMPLEMENTED METHOD FOR TRANSFORMING AN EVENT NOTIFICATION WITHIN A DATABASE NOTIFICATION INFRASTRUCTURE

FIELD OF THE INVENTION

Embodiments of the present invention generally relate to information management systems and, more particularly, to a computer implemented method and a system for an event notification within a database notification infrastructure of a database system.

BACKGROUND OF THE INVENTION

A database system is an organized body of related information. Typically, a database stores a variety of information for an entity. Frequently, a database has different clients that access it for different reasons. Some database users, for example, are interested in changes that occur in a database. A change in a database can be significant or minor and may be called an event. Normally, a database user is not interested in every event that occurs in a database. More likely, a database user is only interested in the occurrence of certain database events. As a consequence of this need, database notification infrastructures allow database users to set up event registrations in which the clients can receive event notifications when certain database events occur. For example, a user can set up an event registration so that an event notification will be sent when a event notification is being enqueued and the message may indicate that a database change has happened.

Traditionally, in order for a client to consume an event notification, the client must establish or maintain an active connection with the database and request the database for the event notification. Alternatively, a client may register with the database to be notified when an event notification becomes available. However, certain types of event notifications, such as an ADT event notification payload, cannot be delivered to the client unless the client has an active session with the database because the format is proprietary and requires the client to be connected to the database. In other words, an ADT formatted notification may not be read offline.

This approach may be problematic and may cause inefficiency. For example, a database and a client's geographical locations may cause it to be inconvenient or impossible for the client to frequently communicate with the database. As a result, clients will not be able to consume event notifications as efficiently. Also, databases may be required to devote more memory space into storing unconsumed event notifications.

Furthermore, conventionally, delivery of an event notification means the entire event notification is sent to the client. However, certain event notifications may be very large and a client may be only interested in a small portion of the event notification. For example, an event notification regarding an instance of a database going down may contain information such as what time the database went down, why the database went down, and thousands of bytes of other detailed information. However, a client may be only interested in what time the database went down and may not care about the remainder of the data.

Thus, delivering complete event notifications will often lead to a waste of resources. By delivering unnecessary information along with pertinent information, communication bandwidth and processing power of databases are diverted away from other applications. Consequently, the overall efficiency of databases will be lowered.

SUMMARY OF THE INVENTION

Accordingly, a computer implemented method for transforming an event notification to a client specific format within a database notification infrastructure is disclosed. In one embodiment, the method includes transforming the event notification having a format compatible with a database using a client specific format conversion procedure into a client-compatible event notification format. Further, in another embodiment, the method includes transforming the payload portion of the event notification having a format compatible with a database using a client specific format conversion procedure into a linear event notification format. Moreover, in another embodiment, the method includes transforming the event notification using a client specific editing procedure.

In one embodiment, the method includes receiving an event registration from a client, wherein the event registration specifies a client-compatible event notification format. Also, the method includes logging the event registration into an event queue of the database notification infrastructure. Further, the method includes accessing an event notification relevant to the registration where the event notification has a format compatible with a database system. Moreover, the method includes transforming the event notification having a format compatible with a database into a client-compatible event notification using the client specific format conversion procedure, wherein the client specific format conversion procedure is stored on the database notification infrastructure. The method also includes sending the transformed message to the client.

In another embodiment, the method includes receiving an event registration, wherein the event registration specifies a client specific linear event notification format. Also, the method includes logging the event registration into an event queue of the database notification infrastructure. Further, the method includes accessing an event notification having a format compatible with a database system. Moreover, the method includes transforming the payload portion of the event notification having a format compatible with a database into the linear event notification using a client specific format conversion procedure, wherein the client specific format conversion procedure is stored on the database notification infrastructure. The transformed payload is then forwarded to the client.

In yet another embodiment, the method includes receiving an event registration, wherein the event registration specifies a client specific editing procedure of the event notification. Also, the method includes logging the event registration into an event queue of the database notification infrastructure. Further, the method includes accessing the event notification. Moreover, the method includes transforming the event notification into a client specific edited event notification using a client specific editing procedure, wherein the client specific editing procedure is stored on the database notification infrastructure. The transformed or edited event notification is then sent to the client.

In addition, embodiments are also directed to a computer readable media implemented with methods as disclosed above.

It is appreciated that in accordance with embodiments described above, the client need not be engaged in an active database session in order to receive and read the notification.

DETAILED DESCRIPTIONS OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
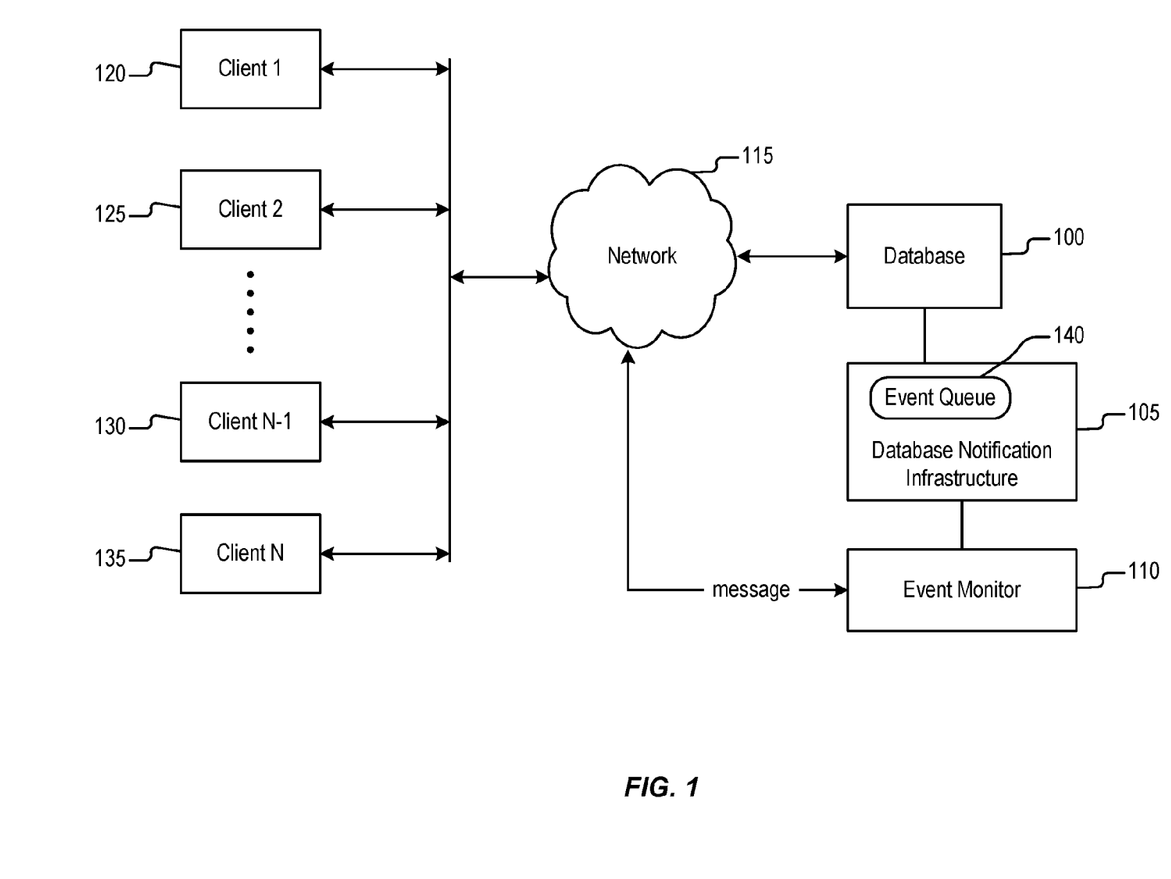
FIG. 1 illustrates a block diagram of a computer implemented system including a database notification infrastructure, according to an embodiment of the present invention.

FIG. 1 illustrates a block diagram of a computer implemented database system including a database notification infrastructure, according to an embodiment of the present invention. Components of the system for database notification infrastructure include a database system 100, a database notification infrastructure 105, an event monitor 110, a network 115, an event queue 140, client1 120, client2 125, client (N-1) 130, and client(N) 135. The database system 100 is an organized body of related information and the event queue 140 of the database notification infrastructure 105 is where event registrations are stored. The event monitor 110 monitors the database system 100 for pertinent events and also performs the functions of notifying relevant clients when certain events occur. Monitored events are registered on the event queue 140. In addition, incorporated by reference herein is U.S. Pat. No. 6,910,070 to further disclose functions that may be performed by event monitor 110. Also, it is appreciated that an event can be many things. For example, an event may be an event notification being published for a subscriber and entered into a queue, an event may be instances of databases going up or down, an event may be a change in database objects, or an event may be an explicit post for a certain entity. Events may be a number of well known database functions. As is well known, the event monitor 110 will monitor for the occurrence of any event on the queue 110 and will generate an appropriate event notification to the registered subscriber. The network 115 is a data communications system that interconnects computer systems at various different sites. The network 115 may be composed of any combination of Local Area Networks or Wide Area Networks.

Each of the clients 120, 125, 130, and 135 may be communicating to the database system 100 through the network 115 that may include, for example, the Internet, a leased line and/or some other public, private, or hybrid network. Any of a number of well known communication links may be used. The database system 100 is coupled to the database notification infrastructure 105 and the event monitor 110. Clients 120, 125, 130, and 135 may each send an event registration to the database notification infrastructure 105 through network 115. After the database notification infrastructure 105 receives an event registration, the event registration will be logged into the event queue 140 of the database notification infrastructure. If an event specified in the event registration by a client occurs, the event monitor 110 will send an event notification through the network 115 to notify the relevant client. Clients that register for an event may be called subscribers for that event. Typically, the event registration will identify an event to be monitored, a subscriber, and one or more parameters described below.

Figure 2:
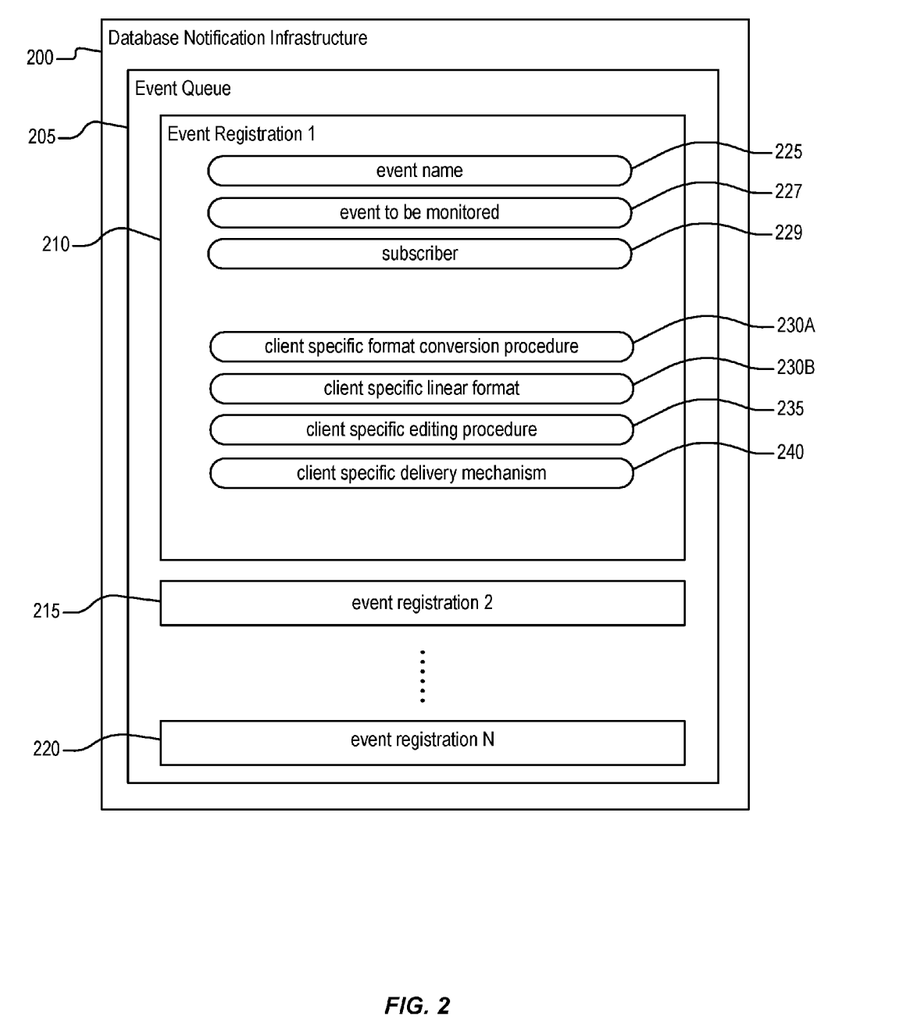
FIG. 2 illustrates a block diagram of components of a database notification infrastructure, according to an embodiment of the present invention.

FIG. 2 illustrates a block diagram of the components of a database notification infrastructure, according to an embodiment of the present invention. The components include the database notification infrastructure 200, the event queue 205, event registration1 210, event registration2 215, event registrationN 220, event name 225, event to be monitored 227, subscriber 229, client specific format conversion procedure 230A, client specific linear format 230B, client specific editing procedure 235, and client specific delivery mechanism 240. The event queue 205 is located within the database notification infrastructure 200 and maintains a history of event registrations. Each event registration pertains to an event that is being monitored and specifies a number of fields including the event to be monitored and the pertinent subscriber. Furthermore, the event registration1 210 through event registrationN 220 are stored within the event queue 205. Thus, the present invention allows a client to specify at the time of registration to the event queue 205 one or more of the following: a client specific format conversion procedure 230A or a client specific linear format 230B, a client specific editing procedure 235, and/or a client specific delivery mechanism 240.

Traditionally, in order for a client to consume an event notification, the client was required to establish or maintain an active connection or session with the database and request the database for the event notification. Alternatively, a client may register with the database to be notified when an event notification becomes available. However, certain types of event notifications, such as an ADT formatted event notification payload, cannot be delivered to the client since the format is proprietary and requires the client to be connected to the database system. This approach may be problematic and may cause inefficiency. For example, a database and a client's geographical locations may cause it to be inconvenient or impossible for the client to frequently establish connections with the database. As a result, clients may not be able to consume event notifications as efficiently. Also, databases may be required to devote more memory space into storing unconsumed event notifications.

Figure 3:
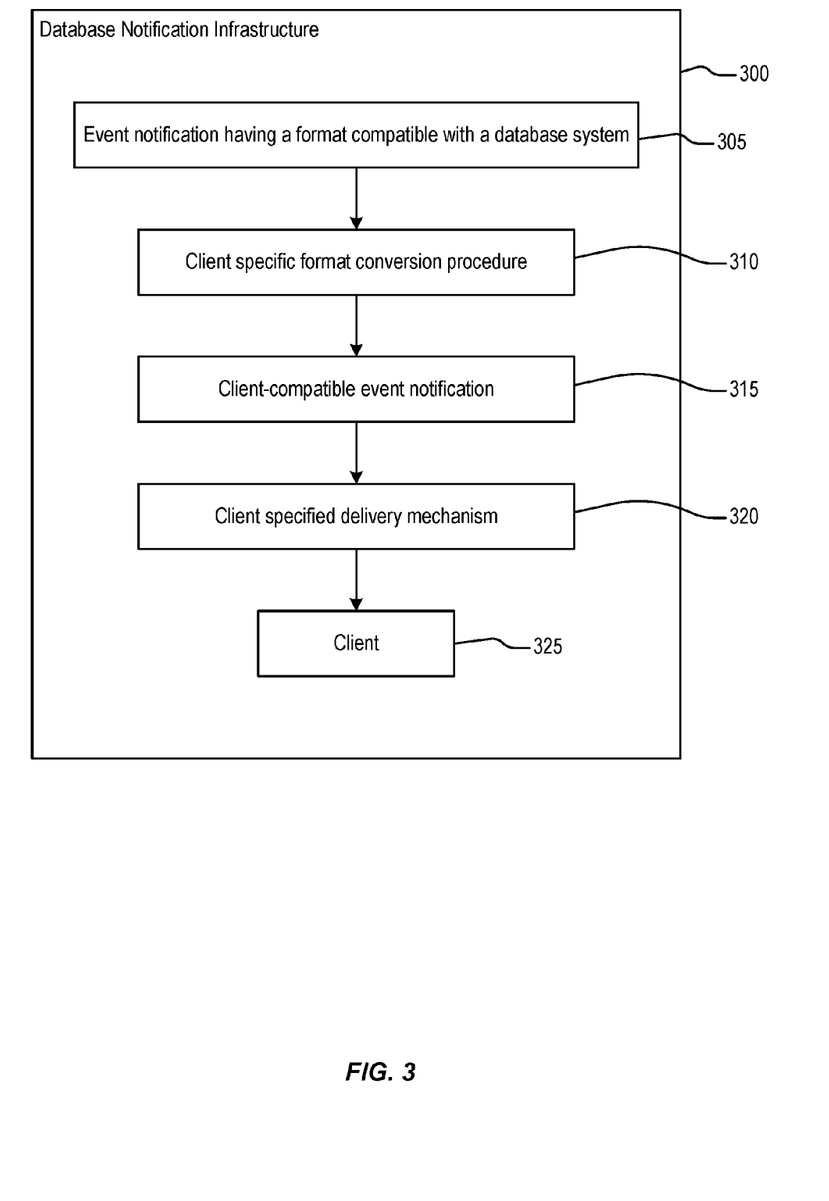
FIG. 3 illustrates a block diagram of a transformation of an event notification within a database notification infrastructure into a client-compatible format in accordance with an embodiment of the present invention.

In contrast to traditional approaches, in one embodiment, as shown in FIG. 3, is a block diagram that illustrates a transformation of an event notification within a database notification infrastructure into a client-compatible event notification. The transformation occurs within the database notification infrastructure 300. First, an event notification having a format compatible with a database system 305 is accessed by a client specific format conversion procedure 310. In one embodiment, this is an ADT format but could be any well known database system format. Next, the client specific format conversion procedure 310 transforms the event notification having a format compatible with the database system 305. For purposes of the present invention, transformation may be performed in many ways. For example, transformation may be performed such that after transformation, the pre-transformation event notification will no longer exist. Alternatively, transformation could mean that after transformation, both a copy of the pre-transformation event notification and a post-transformation client-compatible event notification will both exist. Subsequent to transformation, a client-compatible event notification 315 is generated by the client specific format conversion procedure 310 and may be forwarded using a client specified delivery mechanism 320 to the client 325. Hence, the present invention allows a client to consume event notifications without being connected to the database system. Thus, databases and clients will be able to both function more efficiently.

Conventionally, delivery of an event notification means the entire event notification is sent to the client. This approach has several disadvantages. First, certain event notifications may be very large and a client may be only interested in a small portion of the event notification. For example, an event notification regarding an instance of a database going down may contain information such as what time the database went down, why the database went down, and thousands of bytes of other detailed information. However, a client may be only interested in what time the database went down.

Second, a client may prefer an edited event notification to an unedited event notification. A plethora of possibilities exist for why a client may prefer an edited event notification. In one instance, a client may desire that the event notification be edited in a client specified way such that certain information is emphasized. In another instance, a client may desire that the event notification be translated from a first language to a second language before being delivered to the client. In yet another instance, a client may desire that the event notification be encrypted or decrypted before being delivered to the client.

Thus, delivering an unedited event notification will often lead to delivering of unnecessary information along with pertinent information. This may cause communication bandwidth and processing power to be diverted away from other applications. Consequently, the overall efficiency of a database may be lowered.

Figure 4:
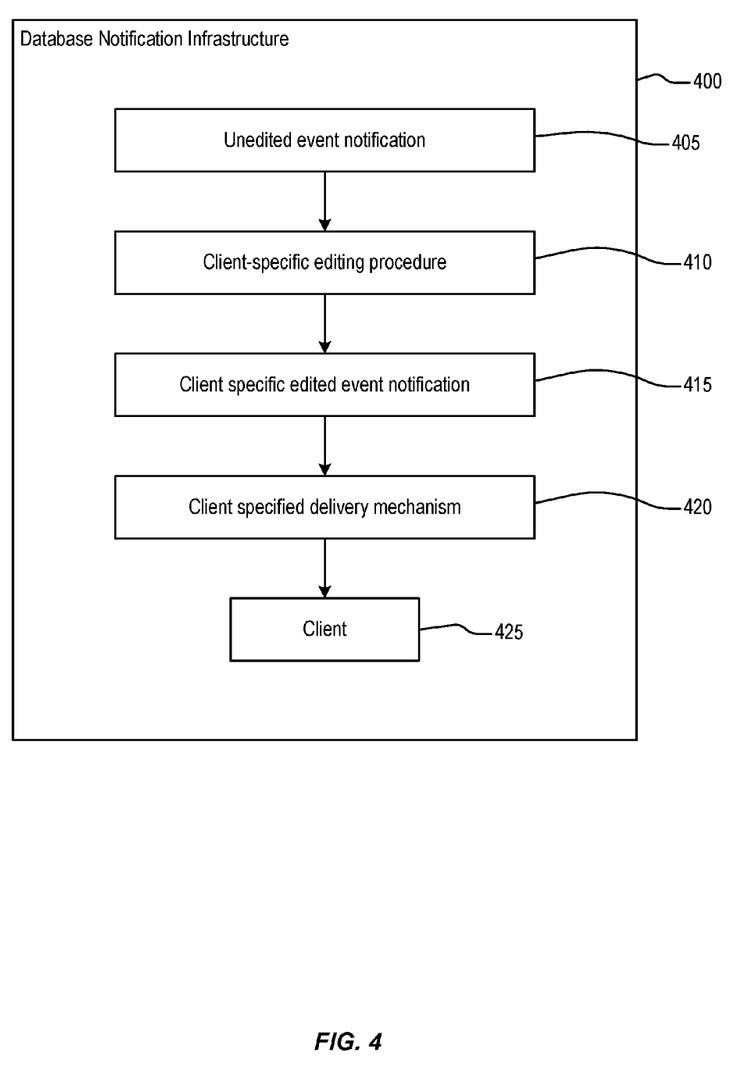
FIG. 4 illustrates a block diagram of a transformation of an unedited event notification within a database notification infrastructure into a client specific edited event notification in accordance with an embodiment of the present invention.

In contrast to conventional approaches, as shown in FIG. 4, is a block diagram that illustrates a transformation of an unedited event notification within a database notification infrastructure into a client specific edited event notification. The transformation occurs within the database notification infrastructure 400. First, an unedited event notification is accessed by a client specific editing procedure 410. This event notification may be of a format compatible with the database system, e.g., ADT formatted. For purposes of the present invention, the client specific editing procedure 410 can perform many functions. For example, the client specific procedure 410 can format the unedited event notification 405 textually, re-organize the unedited event notification 405, emphasize certain parts of the unedited event notification 405, generate a new report or message based on the unedited event notification 405, data-mine the unedited event notification 405, produce multiple copies of the unedited event notification 405, translate the unedited event notification 405 into a different language, and/or encrypt or decrypt the unedited event notification 405. Next, the client specific format conversion procedure 410 transforms the unedited event notification 405. Subsequently, a client specific edited event notification 415 is generated by the client specific format conversion procedure 410, which may be forwarded using a client specified delivery mechanism 420 to the client 425. Hence, embodiments of the present invention allow databases to function more efficiently by preventing communication bandwidth and processing power of databases to be diverted into sending unnecessary information.

Figure 5:
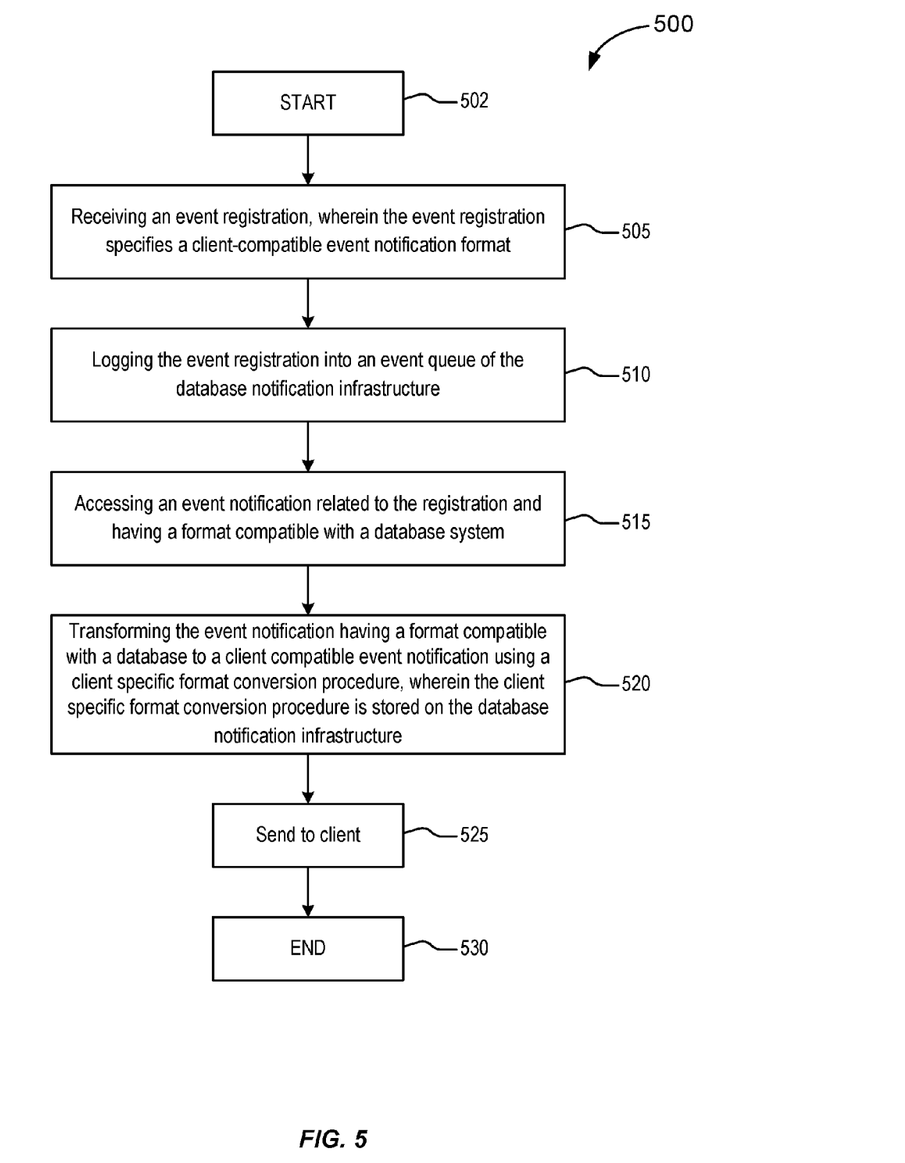
FIG. 5 illustrates a flowchart of a computer implemented method for transforming an event notification within a database notification infrastructure into a client compatible event notification, in accordance with an embodiment of the present invention.

FIG. 5 illustrates a flowchart showing a computer implemented method 500 for transforming an event notification within a database notification infrastructure. At block 502, the process starts. At block 505, the database notification infrastructure receives an event registration (e.g., a registration request from a client), wherein the event registration specifies an event to be monitored, a subscriber, and a client-compatible event notification format or a format conversion procedure. For purposes of the present invention, a client-compatible event notification format can any well known message format. For example, the client-compatible event notification format can be a type of linear format such as text, ASCII, HTML, or XML. At block 510, the event registration is logged into an event queue of the database notification infrastructure.

In one embodiment, an event is generated in the system and the event monitor checks for an interested client. At block 515, the event monitor monitors all events of the database system and identifies an event notification related to the event registration and also having a format compatible with the database system (e.g. ADT format). This event notification is then accessed. At block 520, the event notification having a format compatible with the database is transformed into a client compatible event notification using the client specific format conversion procedure, wherein the client specific format conversion procedure is stored on the database notification infrastructure. At block 525, the client compatible event notification is sent to the client. In one embodiment, the process is repeated for a different event registration. At block 530, the process ends.

Figure 6:
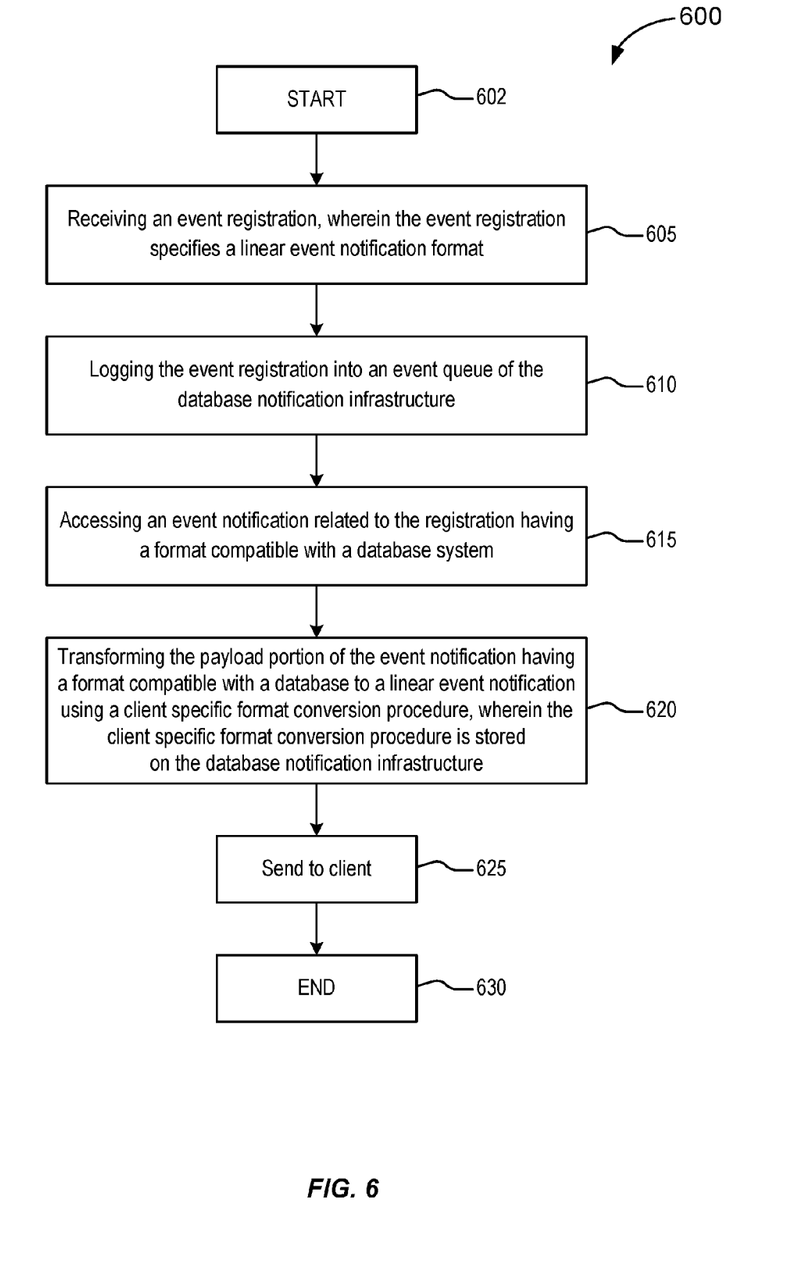
FIG. 6 illustrates a flowchart of a computer implemented method for transforming an event notification within a database notification infrastructure into a linear format, in accordance with an embodiment of the present invention.

FIG. 6 illustrates a flowchart showing a computer implemented method 600 for transforming an event notification within a database notification infrastructure. At block 602, the process starts. At block 605, the database notification infrastructure receives an event registration, wherein the event registration specifies an event to be monitored, a subscriber, and a linear event notification format. At block 610, the event registration is logged into an event queue of the database notification infrastructure.

In one embodiment, an event is generated in the system and the event monitor checks for an interested client. At block 615, an event notification related to the registration and having a format compatible with the database system is discovered by the event monitor. At block 620, the payload portion of the event notification having a format compatible with the database is transformed into the specified linear event notification format using a client specific format conversion procedure, wherein the client specific format conversion procedure is stored on the database notification infrastructure. At block 625, the client specified linear event notification is sent to the client. In one embodiment, the process is repeated for a different event registration. At block 630, the process ends.

Figure 7:
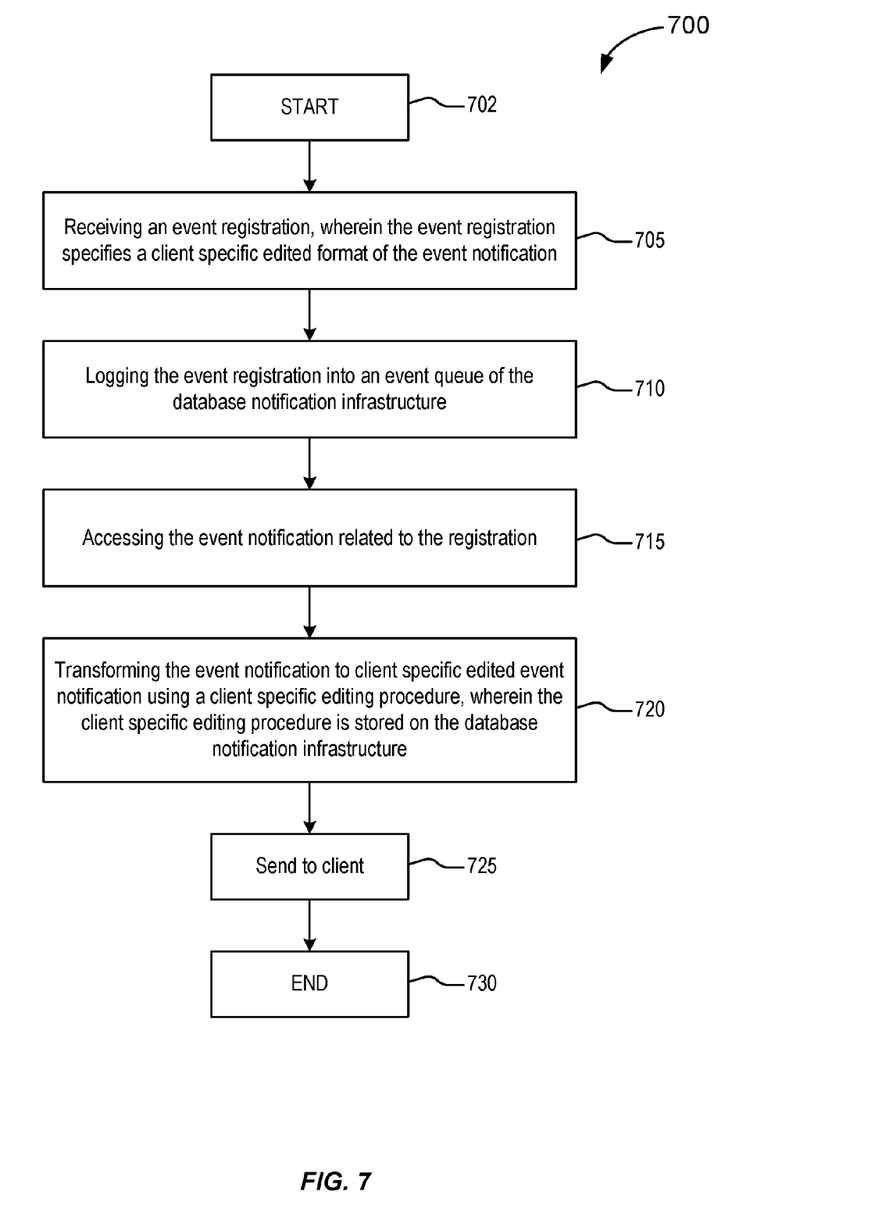
FIG. 7 illustrates a flowchart of a computer implemented method for transforming an event notification within a database notification infrastructure into a client specific edited event notification in accordance with an embodiment of the present invention.

FIG. 7 illustrates a flowchart showing a computer implemented method 700 for transforming an event notification within a database notification infrastructure. At block 702, the process starts. At block 705, the database notification infrastructure receives an event registration, wherein the event registration specifies an event to be monitored, a subscriber, and a client specific edited format of the event notification. At block 710, the event registration is logged into an event queue of the database notification infrastructure.

In one embodiment, an event is generated in the system and the event monitor checks for an interested client. At block 715, the event notification related to the registration is identified by the event monitor and is then accessed. At block 720, the event notification is transformed into a client specific edited event notification using a client specific editing procedure, wherein the client specific editing procedure is stored on the database notification infrastructure. At block 725, the client specific edited event notification is sent to the client. In one embodiment, the process is repeated for a different event registration. At block 730, the process ends.

Figure 8:
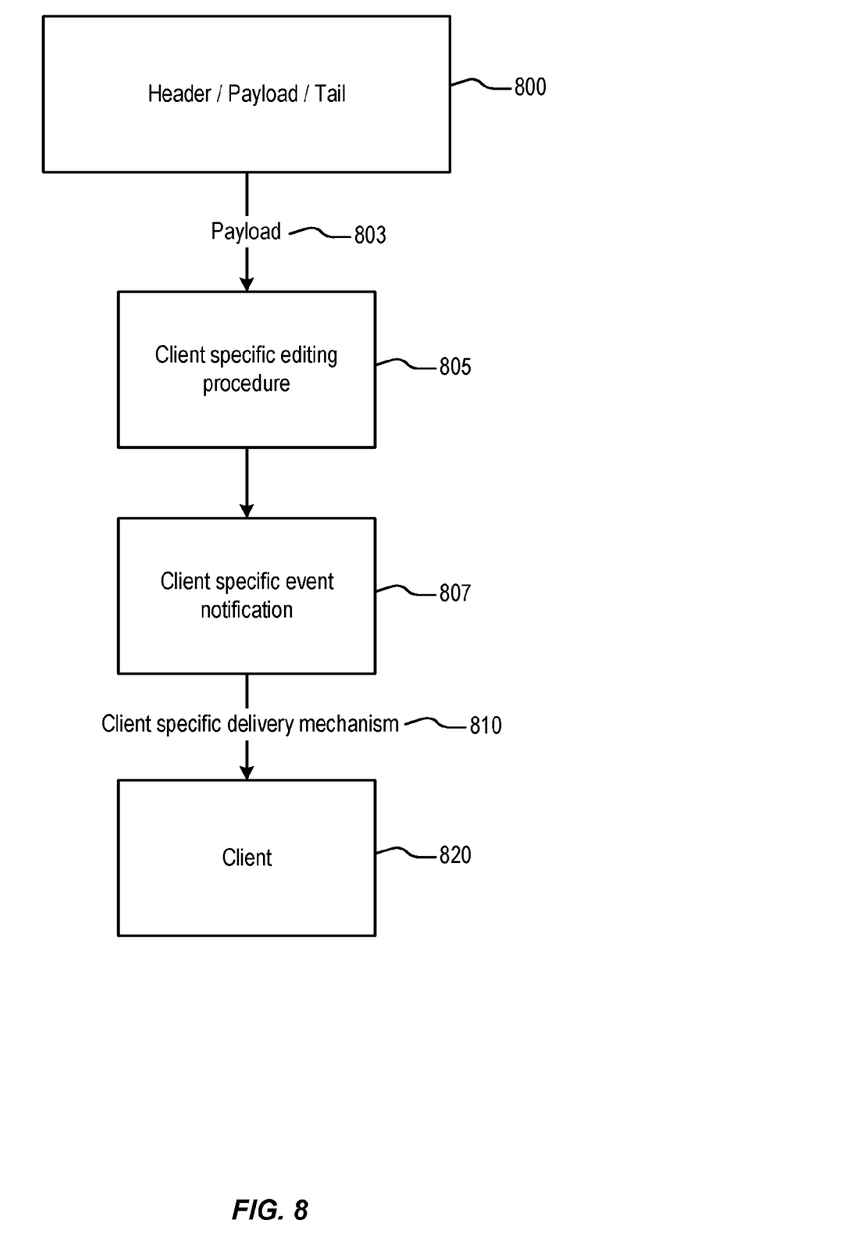
FIG. 8 illustrates a block diagram of a transformation of an event notification using a client specific format conversion procedure and the delivery of the transformed event notification to a client in accordance with an embodiment of the present invention.

FIG. 8 is a block diagram that illustrates a transformation of an event notification and the delivery of the transformed event notification to a client, according to an embodiment of the present invention. Block 800 illustrates an event notification that contains a header, payload, and a tail. The event notification may be formatted according to a database specific format. Block 805 illustrates a client specific format conversion procedure. Block 820 illustrates a client. In this embodiment, only the payload portion 803 of the event notification 800 is accessed by the client specific format conversion procedure 805. The payload portion 803 of the event notification 800 is transformed into a client compatible event notification 807. Subsequently, the client compatible event notification is delivered to a client 820 in pursuant to a client specific delivery mechanism 810. For purposes of the present invention, the delivery mechanism can be any well known communication mechanisms. For example, the delivery mechanism can be by electronic mail, http, delivery over a network to a user specified host and port, and invocation of a stored PL/SQL procedure. Also, delivery of an event notification may be performed by an event monitor. Moreover, delivery of an event notification may be performed by a logical agent coupled to the database notification infrastructure. Further, delivery of an event notification may be performed by the database notification infrastructure itself. Also, by allowing a client to specify a delivery mechanism (e.g., at event registration), the database notification infrastructure will be able to deliver event notifications to clients with lowered failure rates. Thus, the embodiments of the present invention increase the efficiency of event notification delivery.

Figure 9:
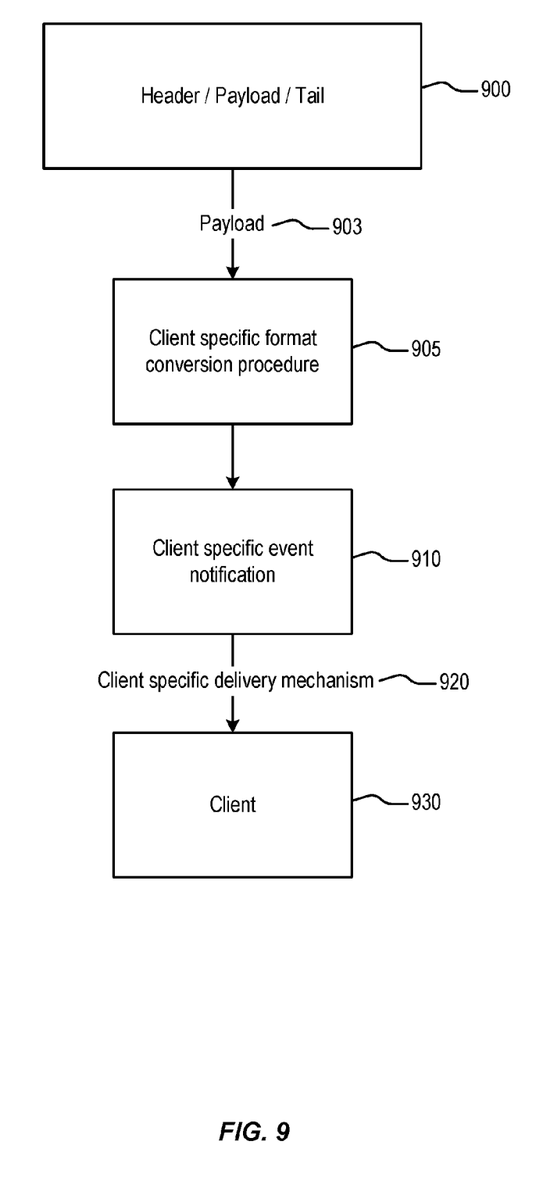
FIG. 9 illustrates a block diagram of a transformation of an event notification using a client specific editing procedure and the delivery of the transformed event notification to a client, according to an embodiment of the present invention.

FIG. 9 is a block diagram that illustrates a transformation of an event notification and the delivery of the transformed event notification to a client, according to an embodiment of the present invention. Block 900 illustrates an event notification that contains a header, payload, and a tail and may be ADT formatted. Block 905 illustrates a client specific editing procedure. Block 930 illustrates a client. In this embodiment, only the payload portion 903 of the event notification 900 is accessed by the client specific editing procedure 905. Next, the payload portion 903 of the event notification 900 is transformed into client specific edited event notification 910. Subsequently, the event notification is delivered to a client 930 in pursuant to a client specific delivery mechanism 920.

Figure 10:
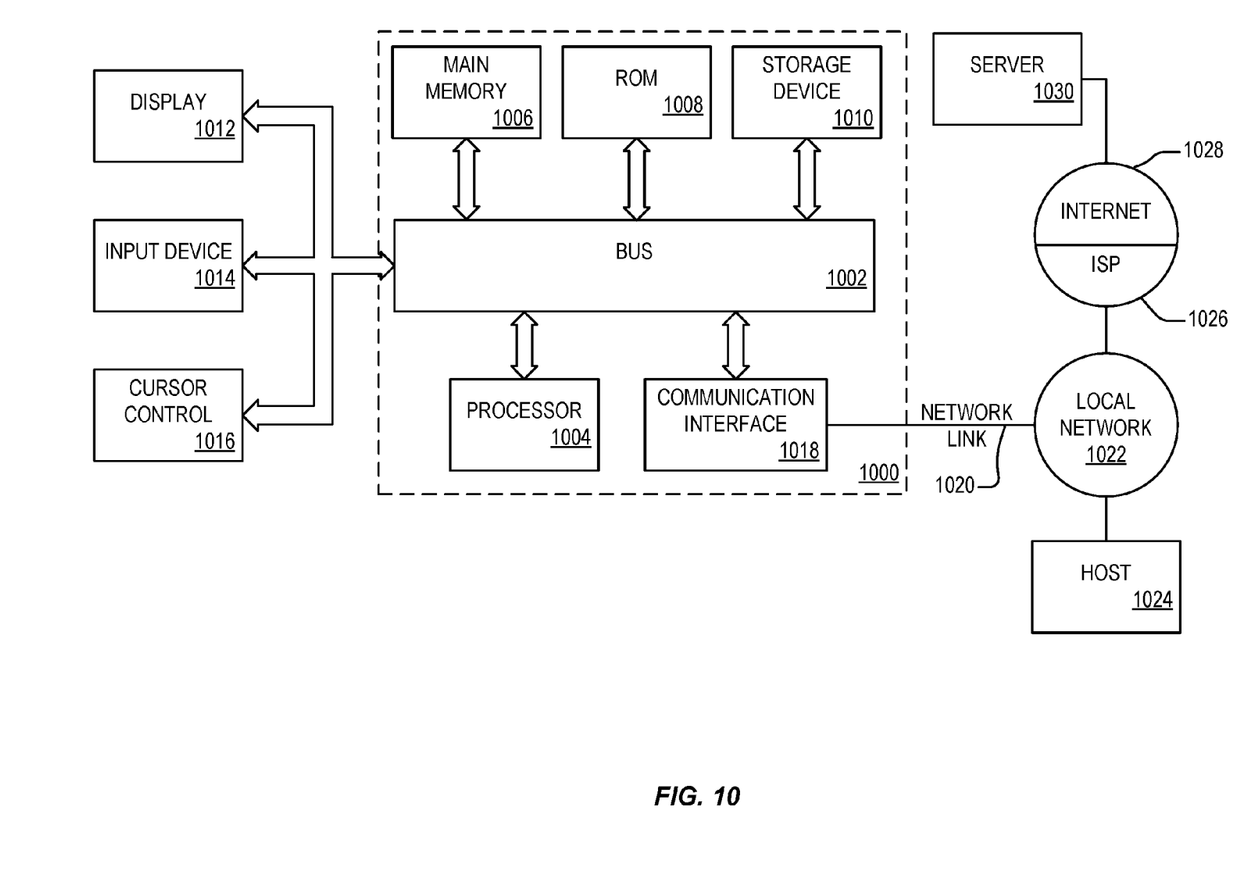
FIG. 10 illustrates a block diagram of a computer system upon which an embodiment of the invention may be implemented in accordance with an embodiment of the present invention.

FIG. 10 is a block diagram that illustrates a computer system 1000 upon which embodiments of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to an optional display 1012 for displaying information to a computer user. An input device 1014, including alphanumeric and other keys, may be coupled to bus 1002 for communicating information and command selections to processor 1004. Another type of user input device may include a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for managing event notifications in a database system. According to one embodiment of the invention, the management of event notifications in a database system is provided by computer system 1000 in response to processor 1004 executing one or more sequences of one or more instructions contained in main memory 1006. Such instructions may be read into main memory 1006 from another computer readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 may also include a communication interface 1018 coupled to bus 1002. Communication interface 1018 may provide a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of carrier waves transporting the information.

Computer system 1000 can send event notifications and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for processing an event notification within a database notification infrastructure of a database system, said method comprising:

receiving information at the database notification infrastructure of the database system that identifies at least one function of a database associated with the database system as a database event to be monitored, said database event being triggered in response to performance of the at least one function by the database associated with the database system;

logging an event registration into an event queue of said database notification infrastructure of the database system based on information received at a time of the event registration indicative of both one or more client-specific format conversion procedures and one or more client-specific editing procedures, wherein the one or more client-specific format conversion procedures and the one or more client-specific editing procedures are stored on the database notification infrastructure;

receiving an event notification generated by the database system in response to monitoring occurrence of said database event within the database system identified by said event registration, said event notification having an event notification format that is compatible with said database system;

editing said event notification in response to triggering at least one of the one or more stored client-specific editing procedures specified at the time of said event registration using the database notification infrastructure of the database system, said edited event notification including information excluded from the unedited event notification, excluding information included in the unedited event notification, or both;

transforming said edited event notification between said event notification format compatible with said database system and an client-compatible event notification format indicative of a format in which a client-compatible event notification is to be delivered to a client subscribed to said event registration in response to triggering at least one of the one or more stored client-specific format conversion procedures specified at the time of said event registration using the database notification infrastructure of the database system, wherein said transformed event notification includes the same information as the edited event notification and has a format different than that compatible with the database system; and delivering said transformed event notification to said client.

2. The method as recited in claim 1, wherein said event registration also specifies a client-specific event notification delivery mechanism and wherein said delivering uses said delivery mechanism.

3. The method as recited in claim 2, wherein said delivery mechanism is selected from the group comprising: electronic mail; http; delivery over a network to a user specified host and port; and invocation of a stored PL/SQL procedure.

4. The method as recited in claim 1, wherein said delivering does not require said client to be logged into said database system.

5. The method as recited in claim 1, wherein said client-compatible event notification format is a linear format.

6. The method as recited in claim 5, wherein said linear format is selected from the group comprising: text; HTML; and XML.

7. The method as recited in claim 1, wherein said format compatible with said database system is an ADT event notification format.

8. The method as recited in claim 1, wherein said event registration specifies the one or more client-specific format conversion procedures to be stored on the database notification infrastructure.

9. A computer implemented method for processing an event notification within a database notification infrastructure of a database system, said method comprising:

receiving information at the database notification infrastructure of the database system that identifies at least one function of a database associated with the database system as a database event to be monitored, said database event being triggered in response to performance of the at least one function by the database associated with the database system;

logging an event registration into an event queue of said database notification infrastructure of the database system based on information received at a time of the event registration indicative of both a linear event notification format in which event notifications should be delivered to a client and one or more client-specific editing procedures, wherein the linear event notification format and the one or more client-specific editing procedures are stored on the database notification infrastructure;

receiving an event notification generated by the database system at said database notification infrastructure in response to monitoring occurrence of said database event within the database system identified by said event registration, said event notification having an event notification format that is compatible with said database system;

editing said event notification in response to triggering at least one of the one or more client-specific editing procedure stored using the database notification infrastructure of the database system in association with said linear event notification format, said edited payload portion including information excluded from the unedited event notification, excluding information included in the unedited event notification, or both;

transforming said edited payload portion of said event notification between the format compatible with said database system and said linear format in response to triggering at least one of the one or more client-specific format conversion procedure specified at the time of said event registration using the database notification infrastructure of the database system, wherein said transformed payload portion includes the same information as the payload portion of said edited event notification and has a format different than that compatible with the database system; and delivering an event notification with said transformed payload in said linear format to said client.

10. The method as recited in claim 9 wherein said delivering uses a client specific event notification delivery mechanism and wherein said event registration also specifies said client-specific event notification delivery mechanism.

11. The method as recited in claim 10, wherein said delivery mechanism is selected from the group comprising: electronic mail; http; delivery over a network to a user specified host and port; and invocation of a stored PL/SQL procedure.

12. The method as recited in claim 10, wherein said delivering does not require said client to be logged into said database system.

13. The method as recited in claim 9, wherein said linear format is selected from the group comprising: text; HTML; and XML.

14. The method as recited in claim 9, wherein said event notification having a format compatible with said database system is an ADT event notification.

15. The method as recited in claim 9, wherein said event registration also specifies said client-specific format conversion procedure to be stored on the database notification infrastructure.

16. A system comprising:

a processor; and a memory configured to store a set of instructions that when executed by the processor configure the processor to:

receive information that identifies at least on function of a database as a database event to be monitored within a database system;

register the database event based on information received at a time of an event registration indicative of both one or more client-specific format conversion procedures and one or more client-specific editing procedures, wherein the one or more client-specific format conversion procedures and the one or more client-specific editing procedures are stored on the database notification infrastructure store the one or more client-specific editing procedures and the one or more client-specific format conversion procedures as stored database procedures;

receive an event notification in response to monitoring occurrence of said database event, said event notification having a format compatible with said database system;

edit said event notification in response to triggering at least one of the one or more client-specific editing procedures specified at the time of said event registration, said edited event notification including information excluded from the unedited event notification, excluding information included in the unedited event notification, or both; and transform said edited event notification into a client compatible event notification using at least one of the one or more client-specific format conversion procedure specified at the time of said event registration, said client compatible event notification including the same information as the edited event notification and having a format different than that compatible with the database system; and deliver said client compatible event notification to said client.

17. The system as recited in claim 16, wherein said event registration also specifies a client-specific event notification delivery mechanism, and wherein said delivering uses said client specific event notification delivery mechanism.

18. The system as recited in claim 17, wherein said client specific event notification delivery mechanism is selected from the group comprising: electronic mail; http; delivery over a network to a user specified host and port; and invocation of a stored PL/SQL procedure.

19. The system as recited in claim 16, wherein said delivering does not require said client to be logged into said database system.

20. A non-transitory computer readable medium having stored therein instructions that when executed by a processor implement a method of processing an event notification within an event notification infrastructure of a database system, non-transitory computer-readable medium comprising:

instructions configured for receiving information at the database notification infrastructure of the database system that identifies at least one function of a database associated with the database system as a database event to be monitored, said database event being triggered in response to performance of the at least one function by the database associated with the database system;

instructions configured for logging event registration into an event queue of said database notification infrastructure of the database system based on information received at a time of the event registration indicative of both one or more client-specific format conversion procedures and one or more client-specific editing procedures, wherein the one or more client-specific format conversion procedures and the one or more client-specific editing procedures are stored on the database notification infrastructure;

instructions configured for receiving an event notification generated by the database system in response to monitoring occurrence of said database event within the database system identified by said event registration, said event notification having an event notification format that is compatible with said database system;

instructions configured for editing said event notification in response to triggering at least one of the one or more stored client-specific editing procedures specified at the time of said event registration using the database notification infrastructure of the database system, said edited event notification including information excluded from the unedited event notification, excluding information included in the unedited event notification, or both;

instructions configured for transforming said edited event notification between said event notification format compatible with said database system and a client-compatible event notification format indicative of a format in which a client-compatible event notification is to be delivered to a client subscribed to said event registration in response to triggering at least one of the one or more stored client-specific format conversion procedures specified at the time of said event registration using the database notification infrastructure of the database system, wherein said transformed event notification includes the same information as the edited event notification and has a format different than that compatible with the database system; and instructions configured for delivering said transformed event notification to said client.

21. The non-transitory computer readable medium as recited in claim 20, wherein said event registration also specifies a client-specific event notification delivery mechanism and wherein said delivery uses said delivery mechanism.

22. The non-transitory computer readable medium as recited in claim 21, wherein said delivery mechanism is selected from the group comprising: electronic mail; http; delivery over a network to a user specified host and port; and invocation of a stored PL/SQL procedure.

23. The non-transitory computer readable medium as recited in claim 20, wherein said delivering does not require said client to be logged into said database notification infrastructure.

24. The non-transitory computer readable medium as recited in claim 20, wherein said client-compatible event notification format is a linear format.

25. The non-transitory computer readable medium as recited in claim 24, wherein said linear format is selected from the group comprising: text; HTML; and XML.

26. The non-transitory computer readable medium as recited in claim 20, wherein said format compatible with said database system is an ADT format.

27. The non-transitory computer readable medium as recited in claim 20, wherein said event registration also specifies said format conversion procedure.

28. The method of claim 1, wherein said database event comprises an event notification being published for a subscriber.

29. The method of claim 1, wherein said database event comprises a database starting or stopping.

30. The method of claim 1, wherein said database event comprises a change in a database object.

31. The method of claim 1, wherein said database event comprises a change of data stored in the database.

* * * * *